US006457259B1

(12) United States Patent
Bilofsky et al.

(10) Patent No.: US 6,457,259 B1
(45) Date of Patent: Oct. 1, 2002

(54) PORTABLE APPARATUS FOR DRYING STATOR WINDINGS AND RELATED PROCESS

(75) Inventors: Marc Bilofsky, Middletown, OH (US); Steve Czvizler, West Chester, OH (US); Tom McGonagle, Newportville, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/982,979

(22) Filed: Oct. 22, 2001

(51) Int. Cl.[7] .............................. F26B 3/00; G01M 3/04
(52) U.S. Cl. .............................. 34/467; 34/472; 34/402; 34/406; 34/407; 34/92; 73/40
(58) Field of Search .......................... 34/402, 405, 406, 34/407, 578, 92, 467, 472; 73/40.5 R, 40

(56) References Cited

U.S. PATENT DOCUMENTS

| | | | | |
|---|---|---|---|---|
| 3,122,668 A | * | 2/1964 | Cuny | ............................ 310/53 |
| 4,826,141 A | * | 5/1989 | Buma et al. | ............. 267/64.28 |
| 5,133,136 A | * | 7/1992 | Sykora | ............................ 34/15 |
| 5,287,726 A | * | 2/1994 | Burritt | ............................ 73/37 |
| 5,331,747 A | * | 7/1994 | Stanton | ........................ 34/405 |
| 5,692,314 A | | 12/1997 | Schubert et al. | |
| 6,367,311 B1 | * | 4/2002 | Garg | ........................ 73/40.5 R |

* cited by examiner

Primary Examiner—Ira S. Lazarus
Assistant Examiner—K. B. Rinehart
(74) Attorney, Agent, or Firm—Nixon & Vanderhye P.C.

(57) ABSTRACT

A transportable skid for drying and testing generator stator windings includes a platform supporting a compressor adapted to supply compressed air to the stator winding; a dryer arranged to receive and dry compressed air from the compressor; a buffer tank arranged to receive a relatively small portion of compressed air from the compressor after passing through the dryer; and a receiving tank arranged to receive compressed air from the buffer tank and the compressor after passing through the dryer. A method of drying a stator winding includes the steps of a) providing on a transportable skid a compressor adapted to supply compressed air to the stator windings; a dryer arranged to receive and dry air from the compressor; a buffer tank arranged to receive compressed air from the compressor after passing through the dryer; and a receiving tank arranged to receive compressed air from the compressor after passing through the dryer; b) supplying compressed air from the compressor to a receiving tank at a first predetermined temperature and pressure; c) releasing the compressed air in the receiving tank to the stator winding; d) supplying compressed air to the buffer tank during step b); e) after step b), supplying compressed air from the buffer tank to the receiving tank to partially fill the receiving tank; f) supplying compressed air from the compressor to the receiving tank to completely fill the receiving tank; and g) repeating steps b) through e) until the stator winding is dry.

12 Claims, 4 Drawing Sheets

PORTABLE APPARATUS FOR DRYING STATOR WINDINGS AND RELATED PROCESS

BACKGROUND OF THE INVENTION

This invention relates to a transportable apparatus for drying the stator windings of a generator in preparation for water leak tests.

The water cooled stator windings of large generators are required to be tested at regular intervals to detect any water leaks in the winding by vacuum and pressure decay tests, and to determine the integrity of the insulation system by electrical tests. For both these tests, the water in the winding must be drained and the water passages in the winding dried completely, free of any traces of moisture. This drying and leak test process is currently accomplished with the use of a Hydraulic Integrity Test (HIT) Skid that contains the various apparatus required to perform the test.

In preparation for the test, water retained in the stator winding after the stator winding cooling water system is shut down is drained by opening the drain valves in the inlet and outlet headers. The remaining bulk water is removed by blowing compressed air through the winding. The stator winding is then pressurized with dry compressed air and the air is then released at a rapid rate using a quick release valve. This pressurization and quick decompression, or "blow down" cycle is repeated until no visible mist is present in the air being discharged from the winding. A vacuum is then applied to the winding to boil off remaining traces of moisture until a high level of vacuum is achieved and retained in the winding. Vacuum and pressure decay tests are then performed on the winding.

Currently, the average time required to complete the drying operation and the pressure and vacuum decay tests is about four days. As work on the generator is often in a critical path in the schedule for a turbine generator overhaul, utility customers seek to reduce the time required for these tests even further, and development of this invention addresses that objective.

BRIEF DESCRIPTION OF THE INVENTION

The portable test skid in accordance with the invention contains all necessary equipment to perform the HIT. The major components include a microprocessor controlled compressor, an air dryer, a buffer tank, a main receiving tank and a vacuum pump. In addition, the skid contains all necessary power and control leads, hoses, flanges and valves to hook the skid up to the generator, along with control devices (i.e., microprocessors) and a control panel. The skid is thus a self-contained unit that is transportable to the customer utility site for the stator winding testing scheme.

The compressor is arranged to deliver heated air to the main receiving tank. The compressor has a greater HP rating than compressors used on prior skids. Upstream of the receiving tank, the compressed air flows through multi-channel dryer towers to dry the air and thus enable the air to carry more moisture out of the stator winding. Between the dryer towers and the main receiving tank, a buffer tank is provided that fills with compressed air as the receiving tank empties to the stator winding. This arrangement allows the compressor to operate continuously and thus reduces time between blow down cycles. It is also a feature of the invention to include larger heaters within the main receiving tank to increase the temperature of the compressed air supplied to the winding. Raising the temperature of the air further enhances the ability of the air to carry moisture and thus contributes to the reduction in time required to complete the blow down cycles.

After the moisture in the stator winding has been removed to a satisfactory level, the vacuum and pressure tests are carried out to detect any water leaks in the stator windings.

The use of a compressor with high horsepower and output capacity, coupled with the incorporation of a buffer tank on the skid, and the higher capacity heater in the receiving tank, reduces the drying and testing time by about 34% as compared to prior HIT skids.

Accordingly, in one aspect, the invention provides a transportable skid for drying and testing generator stator windings comprising a platform supporting a compressor adapted to supply compressed air to the stator winding; a dryer arranged to receive and dry compressed air from the compressor; a buffer tank arranged to receive a relatively small portion of compressed air from the compressor after passing through the dryer; and a receiving tank arranged to receive compressed air from the buffer tank and the compressor after passing through the dryer.

In another aspect, the invention relates to a method of drying a stator winding comprising a) providing on a transportable skid a compressor adapted to supply compressed air to the stator windings; a dryer arranged to receive and dry air from the compressor; a buffer tank arranged to receive compressed air from the compressor after passing through the dryer; and a receiving tank arranged to receive compressed air from the compressor after passing through the dryer; b) supplying compressed air from the compressor to a receiving tank at a first predetermined temperature and pressure; c) releasing the compressed air in the receiving tank to the stator winding; d) supplying compressed air to the buffer tank during step b); e) after step b), supplying compressed air from the buffer tank to the receiving tank to partially fill the receiving tank; f) supplying compressed air from the compressor to the receiving tank to completely fill the receiving tank; and g) repeating steps b) through e) until the stator winding is dry.

The invention will now be described in greater detail below in conjunction with the drawings as identified below.

DETAILED DESCRIPTION OF THE INVENTION

Figure 1:
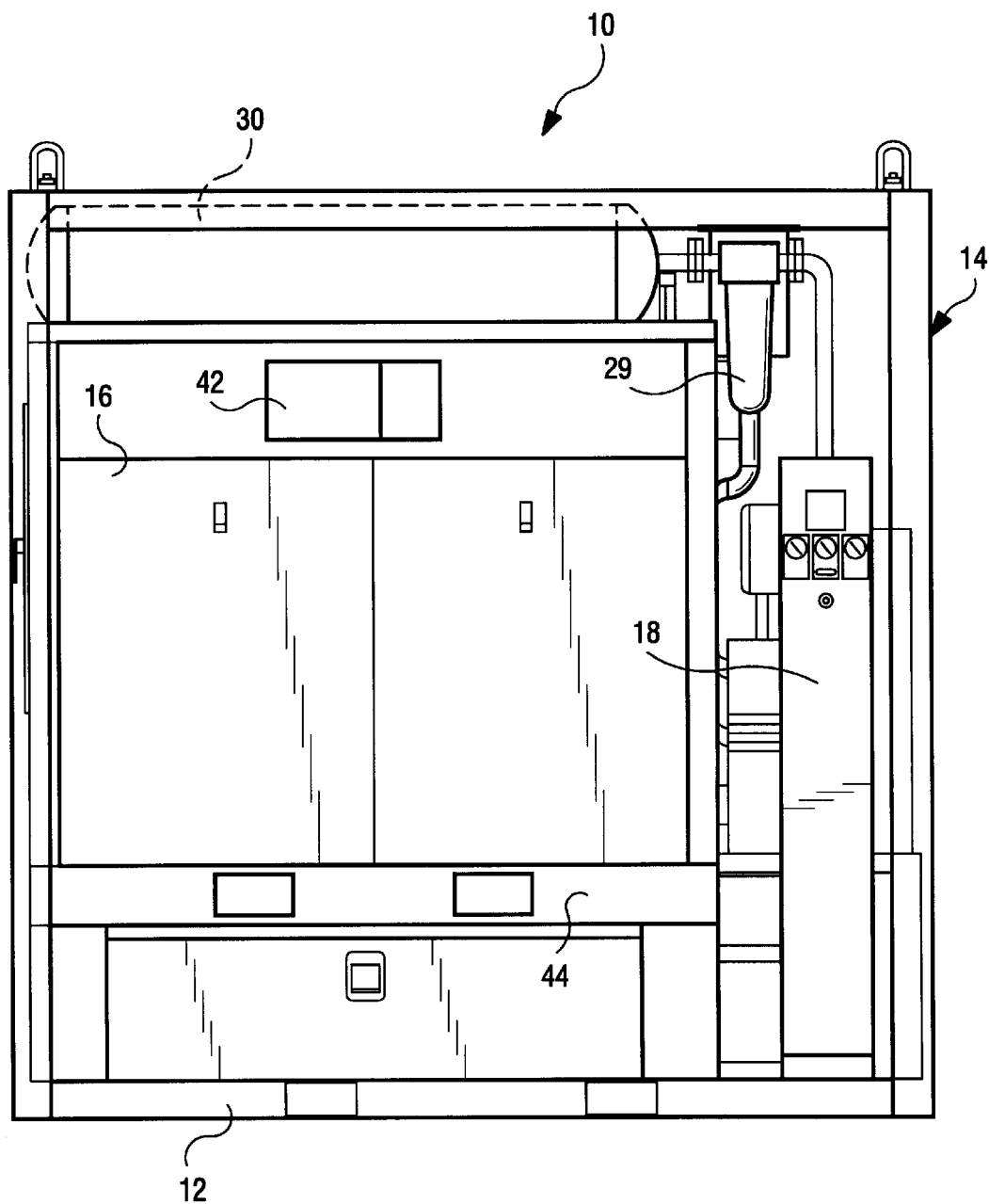
FIG. 1 is a front elevation of the stator drying apparatus skid in accordance with the invention.
Figure 2:
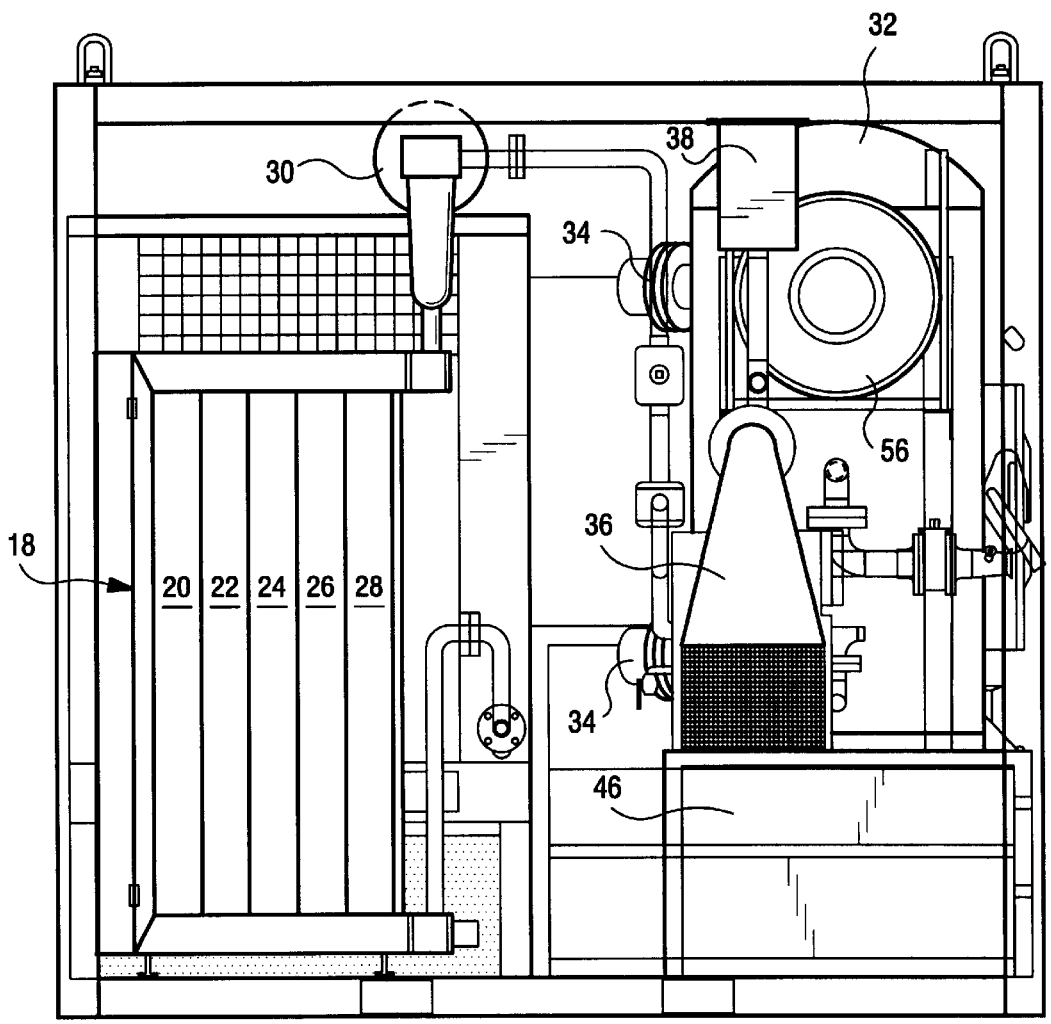
FIG. 2 is a right side elevation of the skid shown in FIG. 1.
Figure 3:
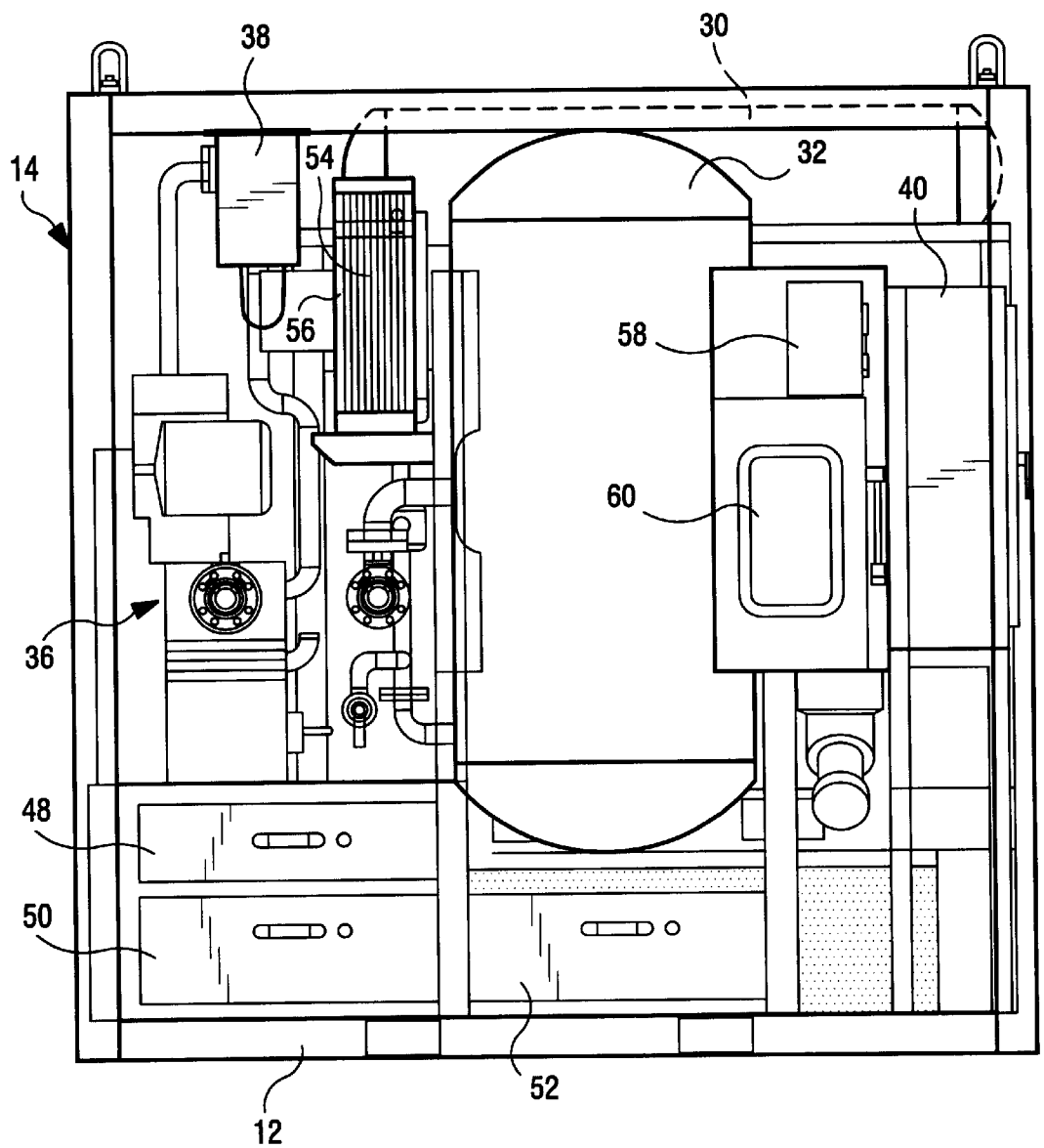
FIG. 3 is a rear elevation of the skid shown in FIG. 1.
Figure 4:
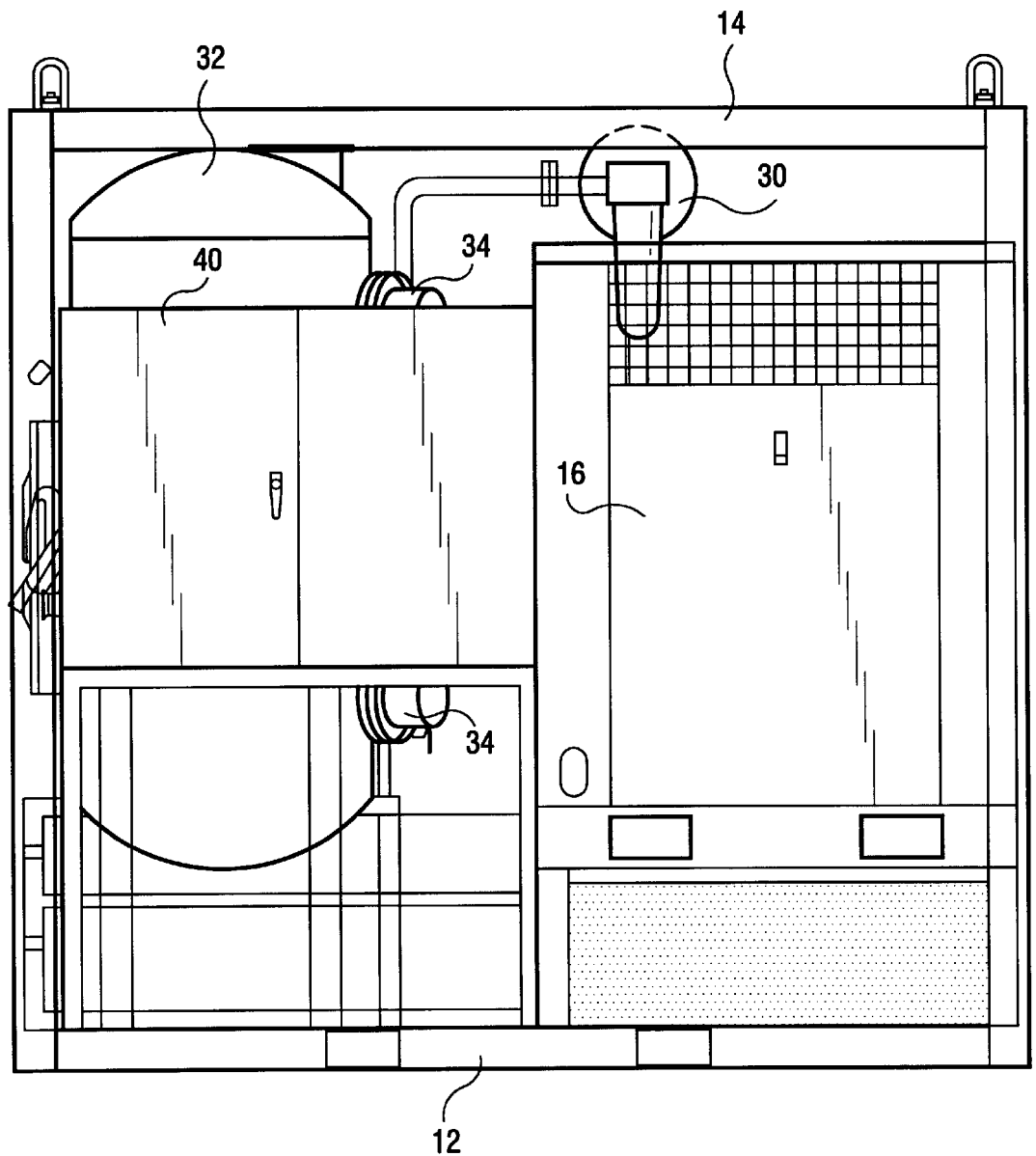
FIG. 4 is a left side elevation of the skid shown in FIG. 1.

The self-contained, portable skid 10 includes a platform 12 with vibration mounts that supports an open box or shell like frame 14. The platform also supports the various components utilized to dry and test the stator winding of a generator (not shown). Specifically, the skid supports a 75 HP compressor 16 capable of delivering 330 CFM at 115–125 PSIG. One such compressor is available from Sullair Corporation. A dryer 18 is located adjacent the compressor and is used for drying the compressed air exiting the compressor 16. The dryer 18 may include two side-by-side sets of five towers (one set shown in FIG. 2 at 20, 22, 24, 26 and 28), and a coalescing filter 29. The dryer, also available from Sullair Corporation, utilizes desiccant beds to remove moisture from the compressed air in an otherwise conventional fashion. By utilizing ten smaller towers (as opposed to the conventional arrangement of two towers, increased contact with the desiccant beds is achieved, resulting in more efficient drying and better purging of the desiccant beds. Microprocessors on the skid monitor the dew point at the outlet of the dryer 18, noting that the dew point at the dryer outlet is required to be −40° C.

A buffer tank 30 is located, flow-wise, between the dryer and a main receiving tank 32. The buffer tank 30 is preferably a 30 gallon tank that is used to keep the compressor from going into an unload mode when the valve to the inlet side of the receiving tank 32 is closed. In other words, when the compressed air is discharged from the receiving tank 32 into the stator winding in a blow down cycle, the buffer tank 30 is immediately pressurized, and after the blow down cycle is completed, the buffer tank will dump into the receiving tank 32, thereby reducing the receiving tank fill time, and allowing the compressor to operate continuously.

The receiving tank 32 is preferably a 200 gallon pressure vessel with welded fittings to reduce the potential for leaks caused by vibrations during transport of the skid. Within the receiving tank are high wattage (6000 watt) heaters 34 that heat the air supplied to the stator windings to about 180° F., thereby enabling the air to carry more moisture out of the stator windings and reduce the Jules Thompson Effect. Every 17° degree rise in temperature provides a doubling of the capacity of the air to carry moisture. This accounts for faster blow downs especially when the generator is still hot.

Other components supported on the skid include a vacuum pump 36 for applying a vacuum to the stator winding after the drying blow down cycles have been completed. The vacuum pump may be a rotary piston, compound vacuum pump available from Kinney Vacuum Division of Tuthill Corporation. Model No. KTC-60 is applicable but other suitable pumps may be employed. An associated oil mist eliminator 38 filters out oil entrained in the gas discharge stream.

The skid also incorporates a control panel 40 and related LED display 42 along with microprocessors (located behind the control panel), electric gang boxes 44, 46, 48, 50 and 52, valves, hoses, power and control leads and any other hardware required to connect the drying apparatus to the stator winding. Note, for example, the cable 54 wound on reel 56 and electrical boxes 58, 60. These components, the various electrical connections and circuitry, as well as the microprocessor controls are within the skill of the art.

In use, after the stator winding cooling system is shut down,. the water retained in the stator winding is drained by opening the drain valves in the inlet and outlet headers of the stator. The remaining bulk water is blown out with compressed air that may or may not come from the skid compressor 16. Under the control of the microprocessor on the skid, the stator winding is then pressurized with dry, heated compressed air supplied via compressor 16, dryer 18, and receiving tank 32 at a first predetermined pressure and temperature. The pressurized air within the stator winding is then released at a rapid rate, using a quick release valve, completing one blow down cycle. As the receiving tank 32 is discharging to the stator winding, the compressor 16 supplies a relatively small portion of compressed air to the buffer tank 30, so that after the receiving tank 32 is empty, the buffer tank 30 will dump compressed air into the receiving tank, thus initiating the refilling of the receiving tank 32 for the next blow down cycle. The compressor 16 then completes the pressurization of the main receiving tank.

The compressor 16 can thus run continuously, preventing the compressor from switching to an unload mode that would otherwise increase blow down cycle time.

The blow down cycles are repeated at higher pressure increments (between, for example, 5 and 90 psi) until the stator winding has been dried to the desired degree, for example, when no visible mist is observed being discharged from the stator winding. Certain fixed time periods are set for each pressure increment. The maximum pressure in the stator winding is 95 psi, and a pressure limit switch on the receiving tank 32 will shut the compressor down when the compressed air in the stator winding reaches 92–95 psi. An automatic pressure relief valve will release pressure from the system at 100 psi. Blow down cycle maximum and minimum pressures are set via a pressure controller in the control panel. Thus, the operation of the skid components is controlled by the onboard microprocessor as a function of pressure in the stator winding.

After drying, the vacuum pump 36 is connected to the stator winding and a vacuum applied to boil off the remaining moisture in the winding. After a high level of vacuum is achieved and retained in the winding, the conventional vacuum and pressure decay tests are performed.

Preliminary results using the test skid disclosed herein permits the drying and leak test operation to be performed in 30–35% less time than the prior skid that utilized a smaller compressor and that did not include a buffer tank.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transportable skid for drying and testing generator stator windings comprising a platform supporting
   a compressor adapted to supply compressed air to the stator winding;
   a dryer arranged to receive and dry compressed air from the compressor;
   a buffer tank arranged to receive a relatively small portion of compressed air from the compressor after passing through the dryer; and
   a receiving tank arranged to receive compressed air from the buffer tank and the compressor after passing through the dryer.

2. The transportable skid of claim 1 wherein said buffer tank has a capacity of about 30 gallons and said receiving tank has a capacity of about 200 gallons.

3. The transportable skid of claim 1 including at least one heater in said receiving tank.

4. The transportable skid of claim 1 including a pair of heaters in said receiving tank rated at about 6000 watts, and capable of raising the temperature of the compressed air to about 180° F.

5. The transportable skid of claim 1 wherein said compressor is a 75 HP compressor.

6. The transportable skid of claim 1 including at least one microprocessor for controlling said compressor.

7. The transportable skid of claim 1 including means for releasing compressed air from said receiving tank into the stator winding.

8. The transportable skid of claim 7 including control means for supplying compressed air from said compressor into said buffer tank while compressed air in said receiving tank is released to the stator winding, and after said buffer tank is pressurized, into said receiving tank.

9. The transportable skid of claim 1 including a vacuum pump adapted to apply a vacuum to the stator winding.

10. A method of drying a stator winding comprising:
   a) providing on a transportable skid a compressor adapted to supply compressed air to the stator windings; a dryer arranged to receive and dry air from the compressor; a buffer tank arranged to receive compressed air from the compressor after passing through the dryer; and a receiving tank arranged to receive compressed air from the compressor after passing through the dryer;
   b) supplying compressed air from the compressor to a receiving tank at a first predetermined temperature and pressure;
   c) releasing the compressed air in the receiving tank to the stator winding;
   d) supplying compressed air to the buffer tank during step b);
   e) after step b), supplying compressed air from the buffer tank to the receiving tank to partially fill the receiving tank;
   f) supplying compressed air from the compressor to the receiving tank to completely fill the receiving tank; and,
   g) repeating steps b) through e) until the stator winding is dry.

11. The method of claim 10 wherein steps c) through f) are repeated at sequentially higher predetermined pressures.

12. The method of claim 10 wherein, after step g), a vacuum is applied to the stator winding to remove remaining moisture from the stator winding.

* * * * *